(12) United States Patent
Smith

(10) Patent No.: US 11,760,501 B2
(45) Date of Patent: Sep. 19, 2023

(54) MEANS FOR HANDLING GASEOUS FUEL

(71) Applicant: Pratt & Whitney Canada Corp., Longueuil (CA)

(72) Inventor: Scott Smith, St. Lambert (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/345,868

(22) Filed: Jun. 11, 2021

(65) Prior Publication Data

US 2022/0396367 A1 Dec. 15, 2022

(51) Int. Cl.
| | |
|---|---|
| B64D 37/32 | (2006.01) |
| F02C 7/25 | (2006.01) |
| B64D 37/34 | (2006.01) |
| F01D 21/00 | (2006.01) |
| F02C 7/224 | (2006.01) |
| F02C 7/232 | (2006.01) |
| F02C 7/32 | (2006.01) |

(52) U.S. Cl.
CPC ............. B64D 37/32 (2013.01); B64D 37/34 (2013.01); F01D 21/003 (2013.01); F02C 7/224 (2013.01); F02C 7/232 (2013.01); F02C 7/25 (2013.01); F02C 7/32 (2013.01); *F05D 2220/323* (2013.01); *F05D 2240/14* (2013.01); *F05D 2260/213* (2013.01); *F05D 2260/605* (2013.01); *F05D 2260/80* (2013.01)

(58) Field of Classification Search
CPC B64D 37/32; B64D 37/34; F02C 7/25; F05D 2260/605
See application file for complete search history.

(56) References Cited

U.S. PATENT DOCUMENTS

| | | | |
|---|---|---|---|
| 9,701,416 B2 | 7/2017 | Epstein et al. | |
| 10,386,259 B2 | 8/2019 | Zhang et al. | |
| 10,473,031 B2 | 11/2019 | Ellsworth et al. | |
| 2010/0293917 A1* | 11/2010 | Handley | F02C 7/00 60/39.08 |
| 2019/0112986 A1* | 4/2019 | Ruston | F02C 7/00 |

FOREIGN PATENT DOCUMENTS

| | | | |
|---|---|---|---|
| DE | 102020111214 A1 * | 10/2021 | B64D 29/00 |
| JP | 2016098783 A | 5/2016 | |

OTHER PUBLICATIONS

English translation of DE102020111214 (Year: 2021).*

* cited by examiner

*Primary Examiner* — Scott J Walthour
(74) *Attorney, Agent, or Firm* — NORTON ROSE FULBRIGHT CANADA LLP

(57) ABSTRACT

In accordance with at least one aspect of this disclosure, there is provided a system for an aircraft engine. In embodiments, the system includes an accessory box and a fuel accessory located in an interior space within the accessory box, where a vent is defined through a wall of the accessory box. In embodiments, the vent includes a plurality of holes or slots in an outer wall of the accessory box for passage of gaseous fuel from the interior space. In embodiments, the vent is configured for passive ventilation of the interior space.

2 Claims, 8 Drawing Sheets

MEANS FOR HANDLING GASEOUS FUEL

TECHNICAL FIELD

This disclosure relates generally to fuel handling. There is always a need for improved handling of gaseous fuels in engines, such as gas turbine engines, in the aerospace industry.

SUMMARY

In accordance with at least one aspect of this disclosure, there is provided a system for an aircraft engine. In embodiments, the system includes an accessory box and a fuel accessory located in an interior space within the accessory box, where a vent is defined through a wall of the accessory box. In embodiments, the vent includes a plurality of holes or slots in an outer wall of the accessory box for passage of gaseous fuel from the interior space. In embodiments, the vent is configured for passive ventilation of the interior space.

In some embodiments the aircraft engine is a gas turbine engine. In some such embodiments, the outer wall of the accessory box forms a portion of an outer nacelle wall of the engine where the outer wall is on an upward facing portion of the outer nacelle wall relative to the direction of gravity.

In some embodiments, the vent includes a forward facing air scoop with an air passage communicating through the outer wall and an exhaust port through a wall of the accessory box downstream of the air scoop relative to flow into the air scoop. In some such embodiments, the exhaust port is defined through the outer wall of the accessory box downstream of the air scoop relative to flow into the air scoop.

In some embodiments, an inner wall of the accessory box forms a portion of an inner bypass duct wall. In some such embodiments, the vent includes a forward facing air scoop with an air passage communicating through the inner wall and an exhaust port through a wall of the accessory box downstream of the forward facing air scoop relative to flow into the air scoop. In some such embodiments, the exhaust port is defined through an outer wall of the accessory box downstream of the air scoop relative to flow into the air scoop.

In some embodiments, the vent includes an inlet defined in wall of the accessory box, and an exhaust opening toward an exhaust jet pipe in an exhaust duct for entraining flow from the inlet through the accessory box, and out the exhaust opening and jet pipe.

In some embodiments, the vent includes a compressor bleed conduit connecting between a compressor and the interior space of the accessory box, and an exhaust port downstream in a wall of the accessory box downstream of the compressor bleed conduit relative to flow from the compressor.

In embodiments, the fuel accessory includes a plurality of fuel accessories, each fuel accessory having an interface connected between another of the plurality of fuel accessories, wherein at least each interface is included within the accessory box. The plurality of fuel accessories can include at least one of a valve, a metering unit, a tube, a tube fitting, a pump, a valve, and/or an evaporator. In embodiments, at least some fuel accessories convey liquid therein and wherein at least some fuel accessories convey gas therein, wherein the gas is evaporated from the liquid.

In embodiments, the system includes an aircraft engine and a fuel system configured to combust gaseous fuel, the fuel system in fluid communication with a fuel source through the at least one fuel accessory, wherein the accessory box is above the engine relative to the direction of gravity.

In accordance with another aspect of this disclosure, there is provided a method for handling gaseous fuel in an aircraft engine comprising, passively ventilating fuel gas out from an interior space of an accessory box through an opening defined through a wall of the accessory box.

In some embodiments, the opening is defined in an upper wall of the accessory box, relative to the direction of gravity, wherein passively ventilating fuel gas includes allowing buoyancy forces to drive fuel gas upward out of the interior space through the opening.

In some embodiments, passively ventilating fuel gas includes purging the interior space with air from outside an engine nacelle, and exhausting the interior space with an exhaust flow directed outward from the engine nacelle.

In some embodiments, passively ventilating fuel gas includes purging the interior space with air from inside an engine nacelle, and exhausting the interior space with an exhaust flow directed outward from the engine nacelle.

In some embodiments, ventilating fuel gas includes purging the interior space with air drawn through the interior space by a downstream jet pipe in an exhaust outlet of an engine nacelle. In some embodiments, ventilating fuel gas includes purging the interior space with compressor bleed air from an engine compressor.

In accordance with yet another aspect of this disclosure, there is provided a system for an aircraft engine. In embodiments the system includes an accessory box, a fuel accessory located in an interior space within the accessory box, a sensor operatively connected to detect fuel gas within the interior space, a ventilation system in fluid communication with the interior space, and a controller operatively connected to the sensor and to the ventilation system. In embodiments, the controller includes machine readable instructions configured to cause the controller to command the ventilation system to actively purge the interior space of fuel gas upon receipt of an input signal from the sensor indicative of presence of the fuel gas within the interior space. In embodiments, the ventilation system includes a selective vent defined through a wall of the accessory box with a venting configuration and a closed position.

In some embodiments, the vent includes an exhaust port door defined through a wall of the accessory box for fluid communication between the interior space and an ambient environment external to the accessory box, wherein an open position allows flow out from the interior space to the ambient environment and wherein a closed position blocks said flow.

In some embodiments, the vent includes an exhaust port door defined through a wall of the accessory box for fluid communication between the interior space and an ambient environment external to the accessory box. In some such embodiments, the ventilation system includes a compressor bleed conduit in selective fluid communication with the interior space through a valve, the valve being operatively connected to the controller to place compressor bleed air in fluid communication with the interior space upon detection of fuel gas in the interior space.

In some embodiments, the ventilation system includes an exhaust port door defined through a wall of the accessory box for fluid communication between the interior space and an ambient environment external to the accessory box, and an air scoop door in a wall of the accessory box upstream of the exhaust port relative to purge flow out of the exhaust port. In some such embodiments, the air scoop door includes an actuator configured to selectively move the air scoop door between an open position and a closed position, the open position allowing flow from the interior space to the ambient environment and the closed position blocking said flow. In some such embodiments, the exhaust port door is positioned on a radially outer wall of the accessory box, and in some embodiments the air scoop door is positioned on a radially inner wall of the accessory box.

In some embodiments, the ventilation system includes an exhaust port door defined through a wall of the accessory box for fluid communication between the interior space and an ambient environment external to the accessory box and a source of compressed inert gas in selective fluid communication with the interior space through a valve. In some such embodiments, the valve is operatively connected to the controller to place the source of compressed inert gas in fluid communication with the interior space upon detection of fuel gas in the interior space.

In embodiments, the sensor includes at least one of a temperature sensor, a flame sensor, and/or a gas species sensor. In embodiments, the accessory box is located in a nacelle. In certain embodiments, an outer wall of the accessory box forms a portion of an outer nacelle wall of the nacelle, where the outer wall is on an upward facing portion of the outer nacelle wall relative to the direction of gravity.

In embodiments, the fuel accessory includes a plurality of fuel accessories, each fuel accessory having an interface connected between another of the plurality of fuel accessories, wherein at least each interface is included within the accessory box. In embodiments, the at least one fuel accessory includes at least one of a valve, a metering unit, a tube, and/or a tube fitting, a pump, a valve, and/or an evaporator. In embodiments, at least some fuel accessories convey liquid therein and wherein at least some fuel accessories convey gas therein, wherein the gas is evaporated from the liquid.

In embodiments, the system can include an aircraft engine and a fuel system configured to combust gaseous fuel, the fuel system in fluid communication with a fuel source through the at least one fuel accessory, where the accessory box is above the engine relative to the direction of gravity.

In accordance with yet another aspect of the present disclosure, there is provide a method for handling fuel gas in an aircraft engine comprising detecting a presence of fuel gas in an accessory box and actively ventilating fuel gas out from an interior space of the accessory box through an opening defined through a wall of the accessory box.

In some embodiments, the at least one opening is defined in an upper wall of the accessory box, relative to the direction of gravity, and actively ventilating fuel gas includes drawing compressor bleed air from a compressor bleed conduit in communication with a compressor to drive fuel gas upward out of the interior space through the opening upon detection of fuel gas in the interior space. In some such embodiments, drawing compressor bleed air from the compressor bleed conduit further includes opening a valve in the compressor bleed conduit upon detection of fuel gas in the interior space.

In some embodiments, actively ventilating fuel gas includes actuating an air scoop door to an open position upon detection of fuel gas in the interior space, purging the interior space with air from inside an engine nacelle through the air scoop, and exhausting the interior space with an exhaust flow directed outward from the engine nacelle.

In some embodiments, actively ventilating fuel gas includes purging the interior space with a compressed inert gas source through the interior space, wherein the compressed inert gas source in fluid communication with the interior space.

In accordance with yet another aspect of the present disclosure, there is provided a system for an aircraft engine comprising an accessory box, a fuel accessory located in an interior space within the accessory box, and a blast door engaged to the accessory box covering an opening in a wall of the accessory box. In embodiments, the blast door is moveable between a first position covering the opening and a second position open to a space external from the accessory box to open a flow path from the interior space to the space external from the accessory box for relief of pressure in the interior space in event of a detonation in the interior space. In embodiments, the wall of the accessory box includes a carbon fiber and/or Kevlar material.

In embodiments, the blast door is engaged to the accessory box with a frangible connection configured to release the blast door from the accessory box to open the flow path in event of a detonation in the interior space. In embodiments, the blast door is hingedly engaged to the accessory box with a biased hinge, where the biased hinge biases the blast door to the first position with a biasing force configured to be overcome by a detonation within the interior space.

In some embodiments, the hinge is positioned on an upper portion of the accessory box and the blast door is configured to swing open on the hinge from the first position to the second position to deflect detonation gas downward in event of a detonation in the interior space. In some such embodiments, the system includes an engine nacelle and the accessory box is located inside the engine nacelle such that the nacelle includes a detonation duct connecting from the accessory box to an exhaust duct of the engine nacelle. A deflector can be mounted in the nacelle between the blast door and a portion of an engine core radially inward from the accessory box.

In some embodiments, the hinge is positioned on a lower portion of the accessory box and the blast door is configured to swing open on the hinge from the first position to the second position to deflect detonation gas upward in event of a detonation in the interior space. In some such embodiments, the system includes an engine nacelle and the accessory box is located inside the engine nacelle such that the nacelle includes a detonation duct connecting from the accessory box to an outward vent of the engine nacelle.

In embodiments, the blast door is passive, configured to open from the first position under forces of a detonation within the interior space. In embodiments, a is sensor operatively connected to the blast door to detect opening of the blast door and produce an output signal indicative of the blast door opening.

In some embodiments, when the blast door in the first position, the accessory box is airtight. In some embodiments, when the blast door is in the first position the blast door is not airtight and an inlet port and an outlet port for evacuation of gas from the interior space can be included.

In embodiments, the fuel accessory includes at least one of a valve, a metering unit, a tube, a tube fitting, a pump, a valve, and/or an evaporator. In embodiments, at least some fuel accessories convey liquid therein and at least some fuel accessories convey gas therein the gas being evaporated from the liquid.

In embodiments, the system further includes an aircraft engine and a fuel system configured to combust gaseous fuel, the fuel system in fluid communication with a fuel source through the at least one fuel accessory, wherein the accessory box is above the engine relative to the direction of gravity.

In accordance with yet another aspect of this disclosure, there is provided a method for handling gaseous fuel in an aircraft engine. In embodiments, the method includes opening a passive blast door of an accessory box under detonation of fuel gas within an interior space of the accessory box. In certain embodiments, the method includes channeling detonation gas from the interior space to an exhaust duct of the aircraft engine. In some embodiments, the method includes channeling detonation gas from the interior space outward from a radially outward surface of an engine nacelle. In certain embodiments, the method includes detecting opening of the blast door and sending a signal indicative of detonation in the accessory box.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
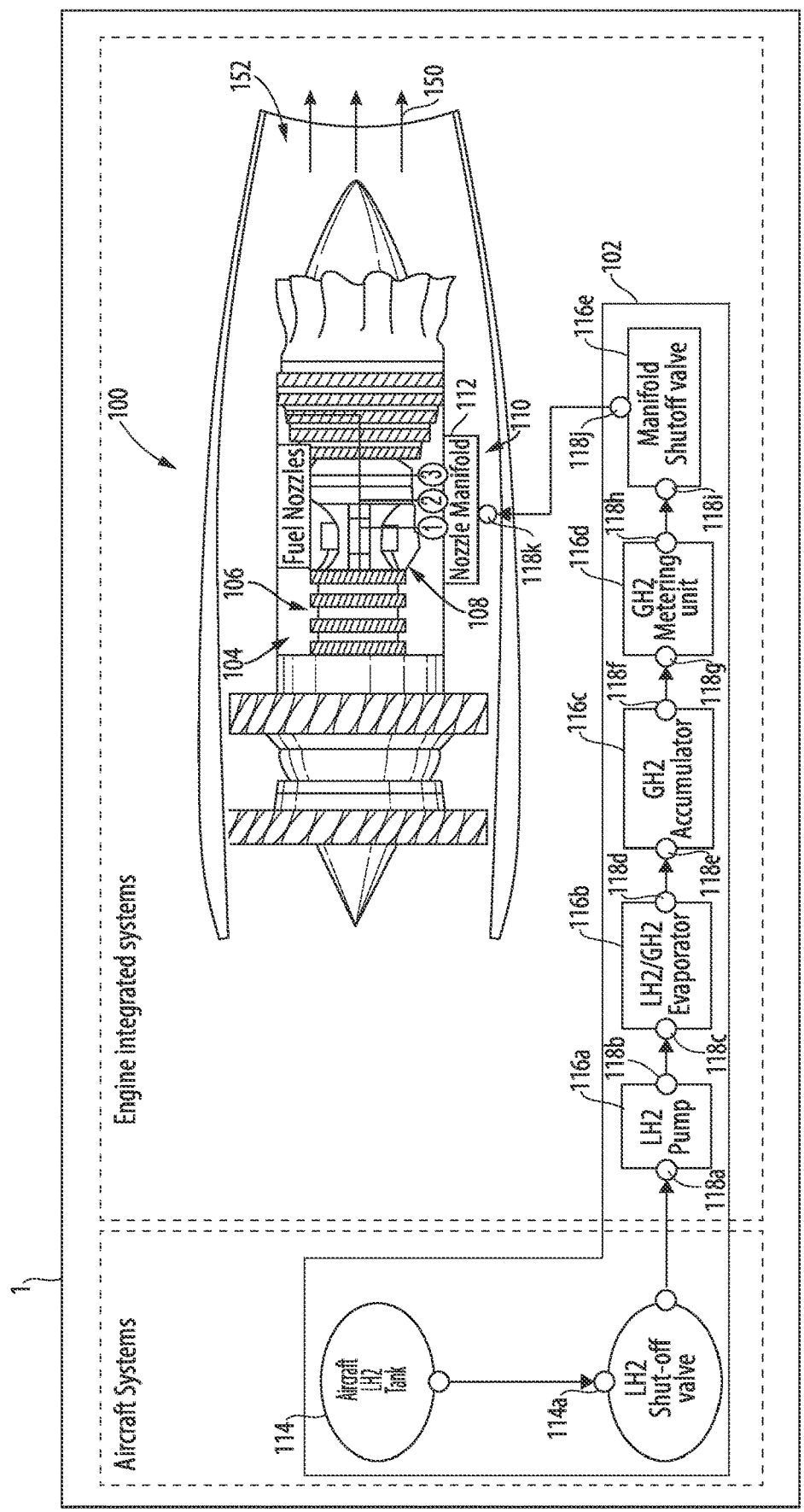
FIG. 1 is a schematic view of an embodiment of an aircraft constructed in accordance with the present disclosure, showing the engine and related aircraft systems.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1. Other embodiments of systems in accordance with the disclosure, or aspects thereof, are provided in FIGS. 2-13, as will be described. The systems and methods described herein can be used to improve management of fugitive fuel gas.

Aircraft engine fuel, by its very nature, is flammable. Careful consideration must be given in the engine design as to how the risks of ignition and detonation of this fuel can be minimized. Fire risks for more typical aircraft engines using liquid fuels are managed by means of minimizing chances of leakage and by removal of fuel from the nacelle using drains. Typical systems and methods have been considered adequate for their intended purposes. Advancing engine designs in to alternative fuels, including gaseous fuels such as hydrogen gas, create a need for improved systems and methods for fuel handling.

For example, as shown in FIG. 1, an aircraft 1 can include an engine 100, where the engine can be a propulsive energy engine (e.g. creating thrust for the aircraft 1), or a non-propulsive energy engine, and a fuel system 102. In the present embodiment, the engine 100 is a turbofan engine, although the present disclosure may likewise be used with any type of gas turbine engine or other engine types, for example rotary engines or reciprocating engines. The engine 100 includes a compressor section 104 having a compressor 106 in a primary gas path 108 to supply compressed air to a combustor 110 of the aircraft engine 100. The primary gas 108 path includes the combustor 110 and nozzle manifold 112 for issuing fuel to the combustor 110 for combustion of fuel where engine exhaust 150 is passed through an exhaust duct 152.

In certain embodiments the fuel system 102 is in fluid communication with a fuel source 114 through at least one fuel accessory 116. In certain embodiments, such as shown in FIG. 1, the fuel accessory 116 can be a plurality of fuel accessories 116a-e. Each fuel accessory 116a-e includes at least one interface 118a-k connected between another of the plurality of fuel accessories. As shown, the plurality of fuel accessories 116a-e can include at least one of a valve, a metering unit, a tube, a tube fitting, a pump, and/or an evaporator, or any suitable combination thereof, however any other suitable fuel accessories are contemplated herein.

In certain embodiments, at least some fuel accessories (e.g. 116a,b) convey liquid (e.g. liquid fuel) and at least some fuel accessories (e.g. 116c-e) convey gas (e.g. gaseous fuel). The gaseous fuel in the fuel accessories 116c-e can be generated from evaporating the liquid fuel of fuel accessories 116a,b, for example using a heat exchanger in the fuel system 102 such that hot compressor air from the primary gas path 108 is in thermal communication with the liquid fuel accessorie(s) 116a,b to evaporate the liquid to gas.

Figure 2:
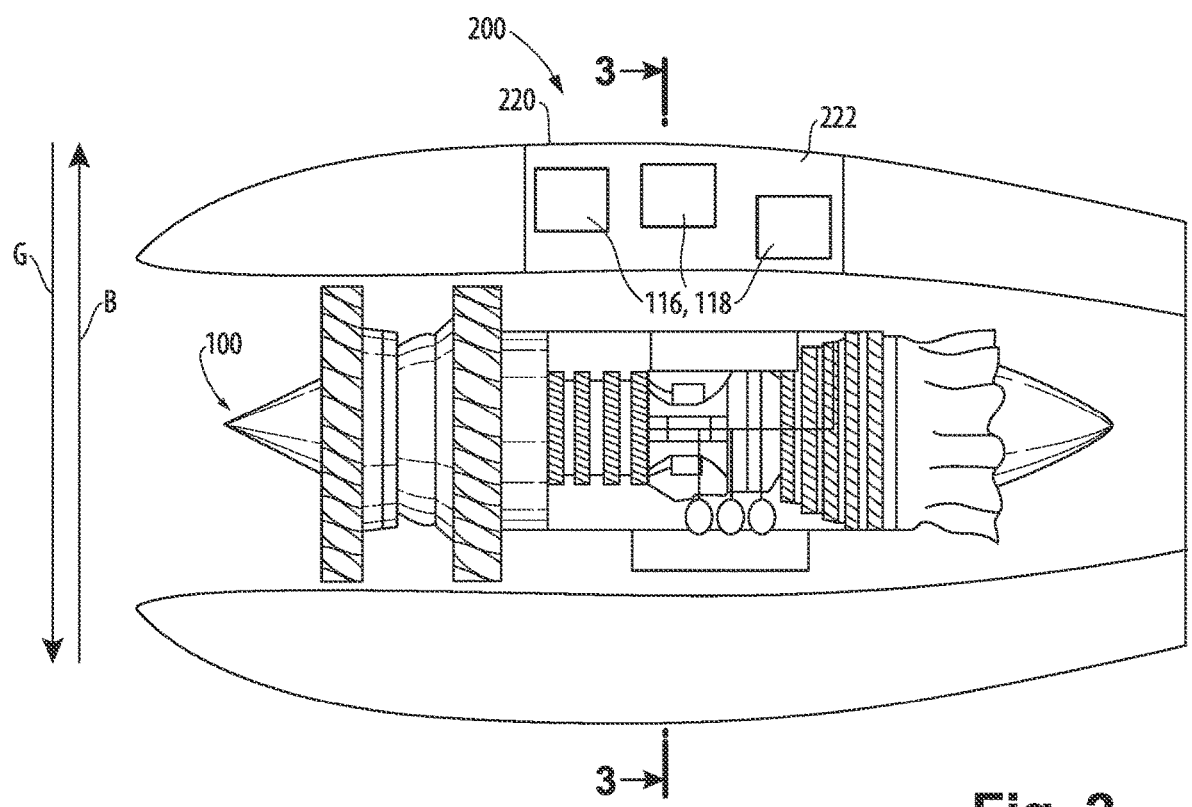
FIG. 2 is a schematic side-elevation view of the aircraft engine of FIG. 1, showing an embodiment of an accessory box and ventilation system.
Figure 3:
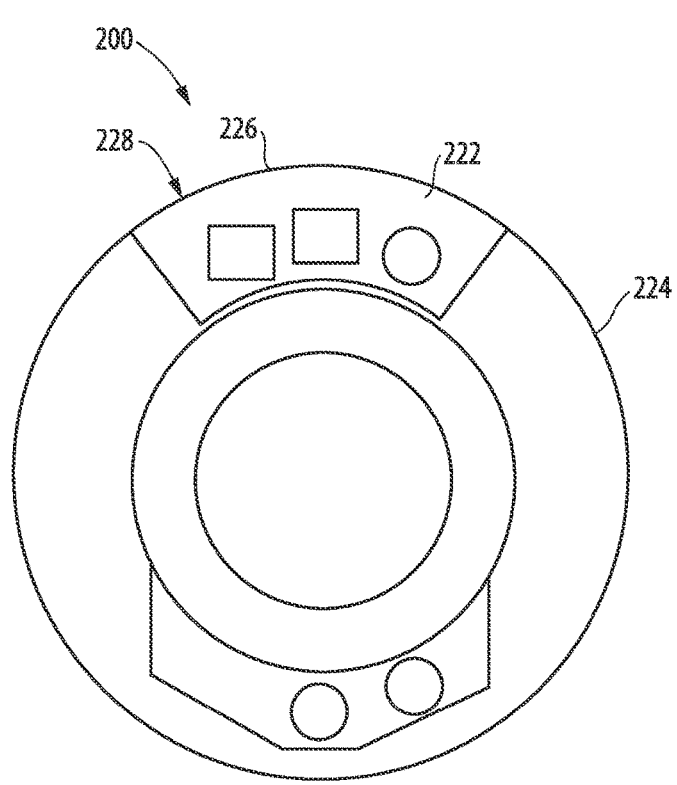
FIG. 3 is a schematic front end view of the aircraft engine of FIG. 2.

Referring now to FIGS. 2-3, in accordance with at least one aspect of this disclosure, there is provided a system 200 for handling fugitive gaseous fuel (e.g. gaseous fuel that may escape from fuel accessories 116c-e) in the aircraft engine 100. The system 200 includes an accessory box 220 defining an interior space 222 is positioned above the engine 100 relative to the direction of gravity G (both when in level flight, or when parked on the ground) so buoyancy forces B can allow lighter-than-air fuel gas (e.g. hydrogen gas), to collect within the interior space 222, and in embodiments, escape the interior space 222 passively. Each interface 118 of the fuel accessories 116 is included within the accessory box 220, however it is contemplated that an entirety of the fuel accessories 116 and interfaces 118 can be included within the accessory box 220. It should be understood that the accessory box 220 is not limited to a conventional "box" definition, e.g. a rectangular container having a flat base and flat sides, though it may take this form. Rather, the accessory box 220 can be a container having any suitable shape necessary to fit within the aircraft engine 100. For example, as shown more clearly in FIG. 3, the accessory box 220 can be in a nacelle 224 where an outer wall 226 of the accessory box 220 forms a portion of an outer nacelle wall 226 of the engine 100, where the outer wall 226 is on an upward facing portion 228 of the outer nacelle wall relative to the direction of gravity G. Accordingly, the accessory box 220 can be annular about a portion of the engine 100 and can match the contour of the nacelle 224. In other engine types, the shape and size of the accessory box 220 can match the specific engine architecture as needed in any suitable manner. Moreover, it is contemplated that the accessory box 220 can be integral with the nacelle 224 or can be a separate component.

Figure 4:
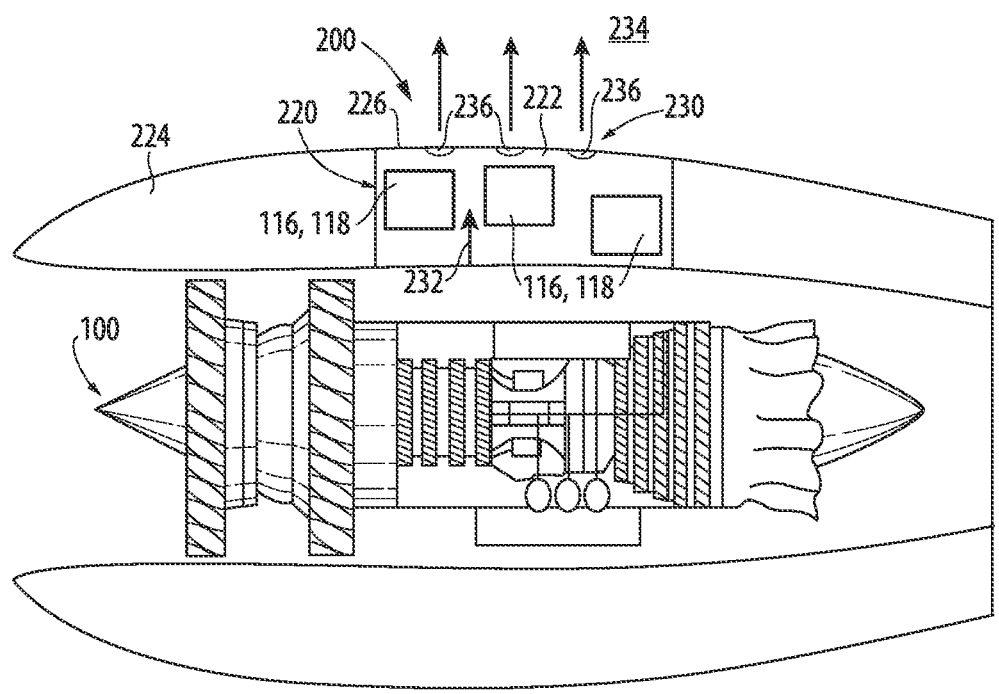
FIG. 4 is a schematic side elevation view of an embodiment of the ventilation system of FIG. 2.

Referring now to FIG. 4, in certain embodiments, a vent 230 is defined through at least one wall of the accessory box 220 for escape of fugitive fuel gas 232 in the interior space 222 to a space external 234 to the accessory box. The vent 230 can take any suitable form, such as in the embodiments disclosed herein, however any suitable means for fluidly communicating the interior space 222 with the space external 234 to the accessory box 220 is contemplated herein. In certain embodiments, such as shown in FIG. 4, the vent 230 can be configured for continuous passive ventilation of the interior space 222. The vent 230 can include a plurality of holes, slots, or other openings 236 in the outer wall 226 of the accessory box 220 for passage of fuel gas from the interior space 222 (e.g. using natural buoyancy of the fugitive fuel gas) to the external space 234.

Figure 5:
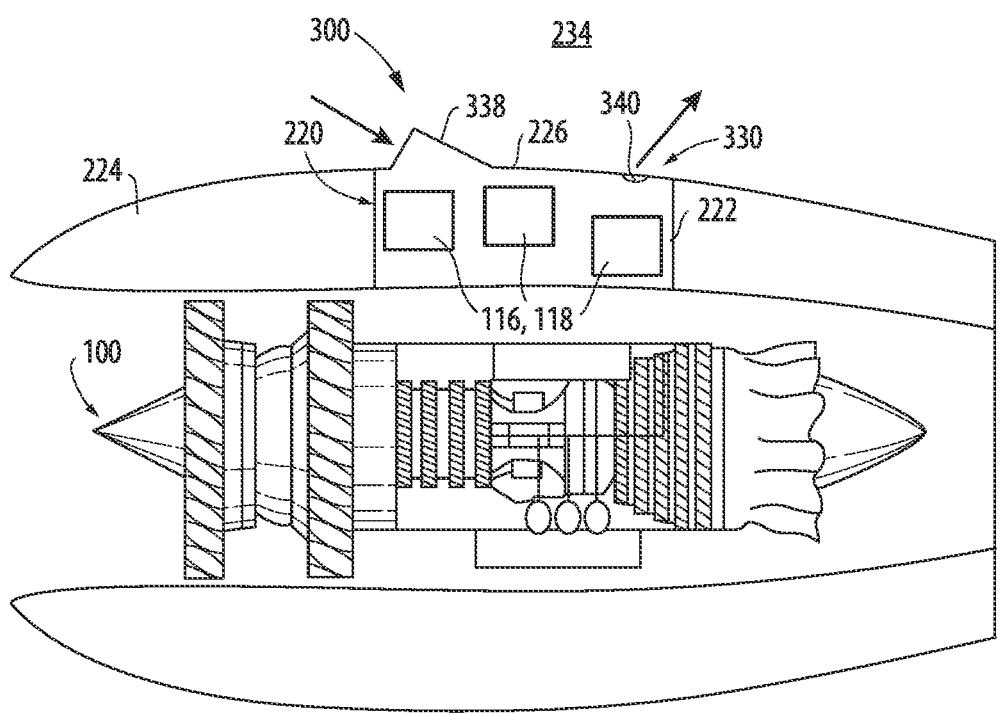
FIG. 5 is a schematic side elevation view of another embodiment of the ventilation system of FIG. 2.

In some embodiments, such as shown in FIG. 5 a system 300 includes a vent 330 includes a forward facing air scoop 338 placed forward on the accessory box 220 relative to the flow over and into the scoop 338. The air scoop 338 can include any suitable means having an air passage for fluid communication from the space external 234 to the accessory box 220 into the interior space 222, for example a ram air scoop, a NACA duct (e.g. to reduce drag), or the like. The air scoop 338 can be defined in a wall of the accessory box (e.g. outer wall 226) so that air external to the accessory box 220 can passively purge the accessory box 220 through the interior space 222 through an exhaust port 340 defined a wall (e.g. outer wall 226) of the accessory box 220 downstream of the air scoop 338 relative to flow into the air scoop 338. This configuration provides for continuous flow of air through the accessory box 220 during flight, for example, to passively purge fuel gas and avoid accumulation of fuel gas in the engine 100.

Figure 6:
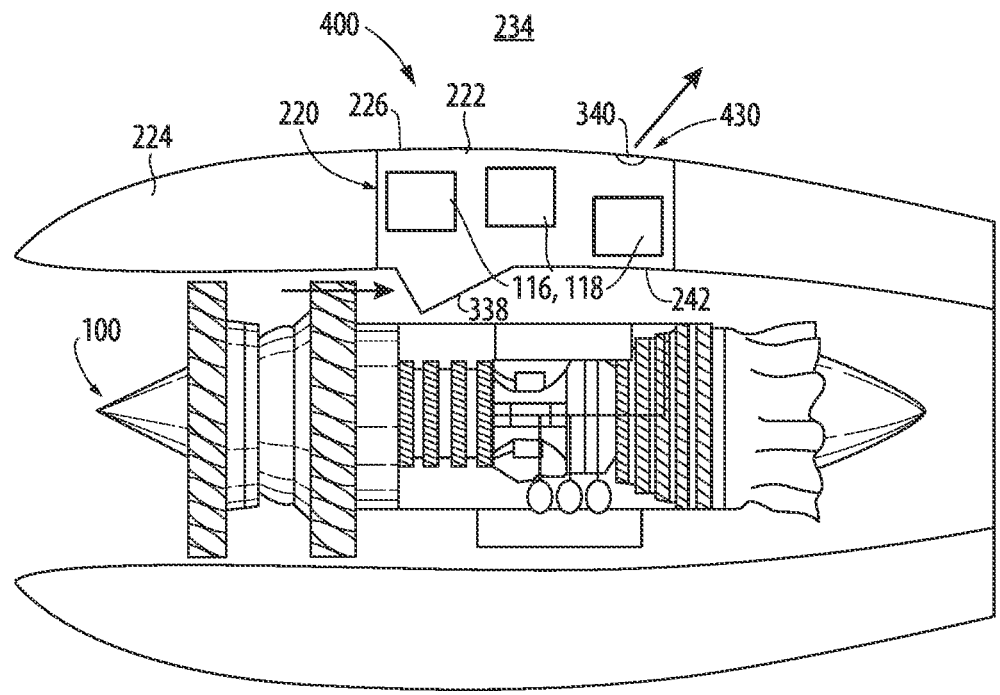
FIG. 6 is a schematic side elevation view of another embodiment of the ventilation system of FIG. 2.

In some embodiments, such as shown in FIG. 6, a system 400 includes a vent 430 that can be similar to that shown in FIG. 5, however, an inner wall 242 of the accessory box 220 can form a portion of an inner bypass duct wall (e.g. in a turbofan engine, the inner nacelle wall) and the air scoop 338 can be disposed on the inner wall 242. The air passage then communicates through the inner wall 242 to the exhaust port 340.

Figure 7:
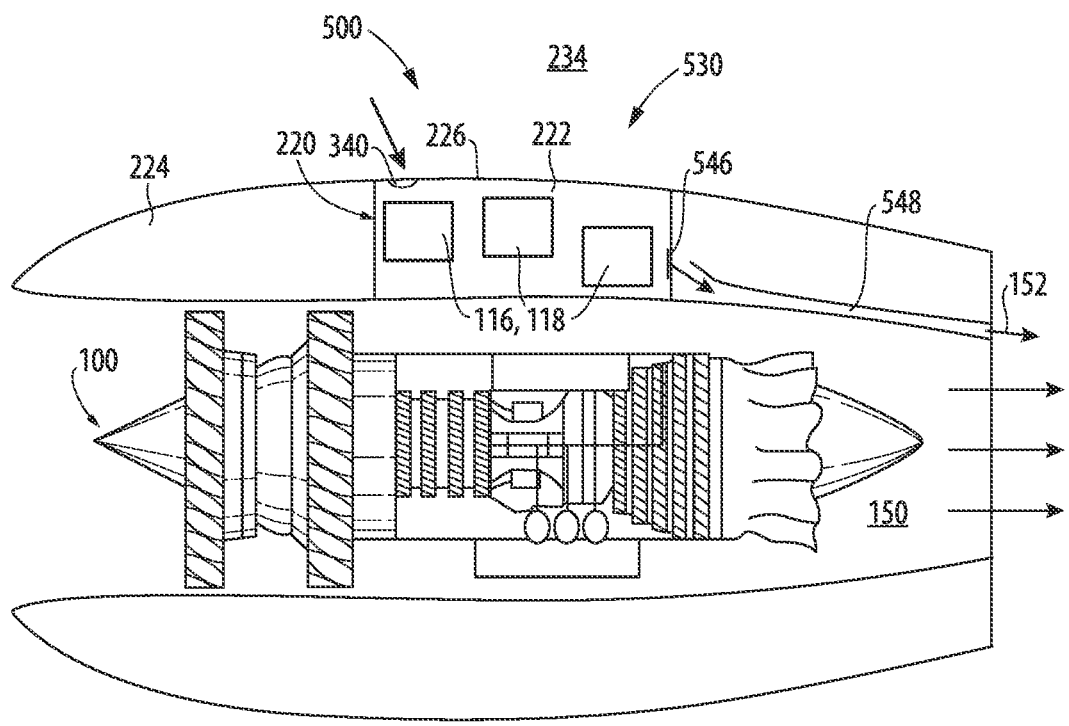
FIG. 7 is a schematic side elevation view of another embodiment of the ventilation system of FIG. 2.

In some embodiments, such as shown in FIG. 7, a system 500 includes a vent 530 having an inlet 544 defined in a wall of the accessory box 220 (e.g. outer wall 226) and an exhaust opening 546 toward an exhaust jet pipe 548. The jet pipe 548 can be in the exhaust duct 152 for entraining flow from the inlet 544 through the accessory box 220. The vented fuel gas can then be exhausted through the exhaust opening 546 with the engine exhaust 150. Because the vented fuel gas is drawn through the jet pipe 548 into the exhaust stream 150, it is safe to combust the fuel gas after it exits the jet pipe 548 while the engine 100 is in operation.

Figure 8:
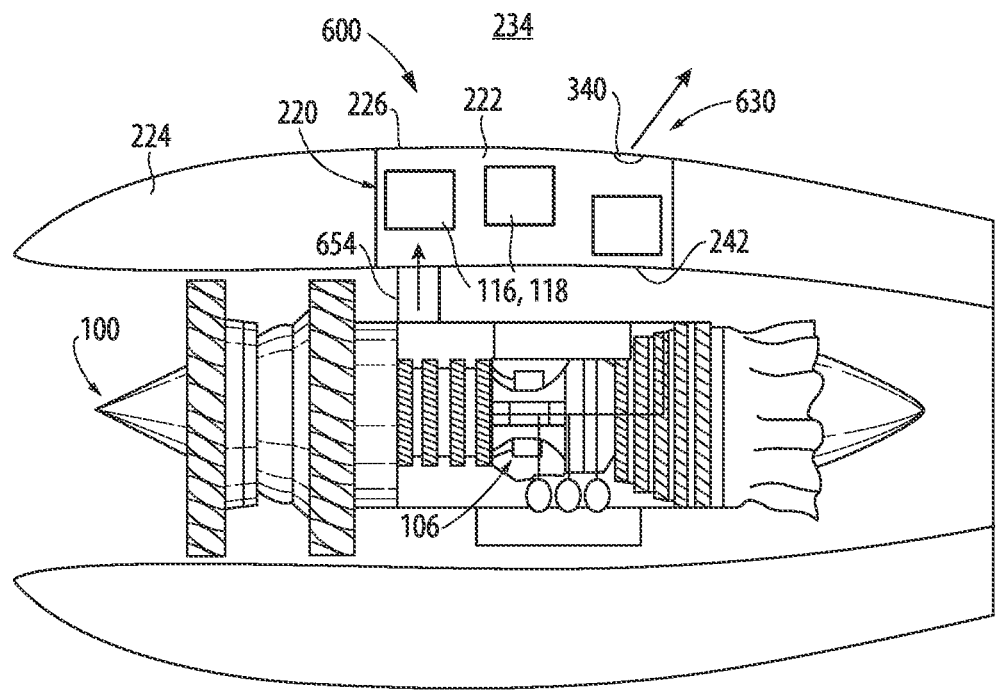
FIG. 8 is a schematic side elevation view of another embodiment of the ventilation system of FIG. 2.

In some embodiments, such as shown in FIG. 8, a system 600 includes a vent 630 having a compressor bleed conduit 654 connecting between the compressor 106 and the interior space 222 of the accessory box 220. The exhaust port 340 is disposed in a wall of the accessory box (e.g. outer wall 226) downstream of the compressor bleed conduit 654 relative to flow from the compressor 106. This passive fixture allows for a continuous flow of purge air from the compressor, through the interior space 222 while the engine 100 is operating.

While the embodiments shown in FIGS. 4-8 are shown and described separately, it is contemplated that in some embodiments, the vent 230 can include any one of or all of the vents as described herein, or any suitable combination thereof.

A method for handling fugitive gaseous fuel in the aircraft engine 100 includes passively ventilating fuel gas out from the interior space 222 of the accessory box 220 through at least one opening defined through a wall of the accessory box 220, for example using any suitable vent 230, 330, 430, 530, 630, or combination of vents as described herein.

Figure 9:
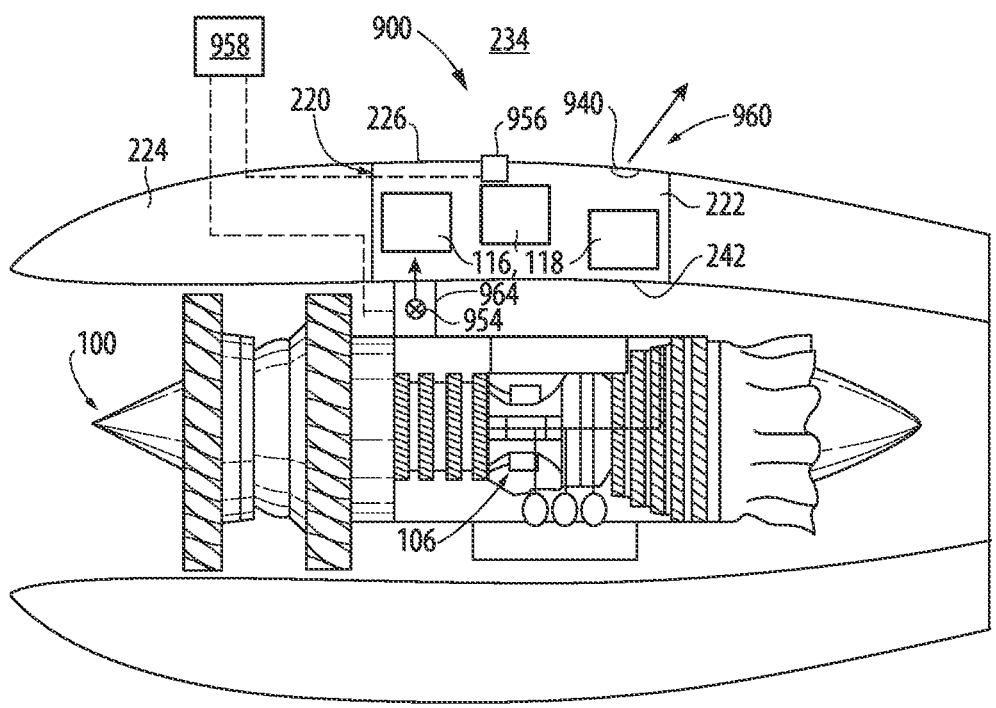
FIG. 9 is a schematic side elevation view of another embodiment of the ventilation system of FIG. 2.
Figure 10:
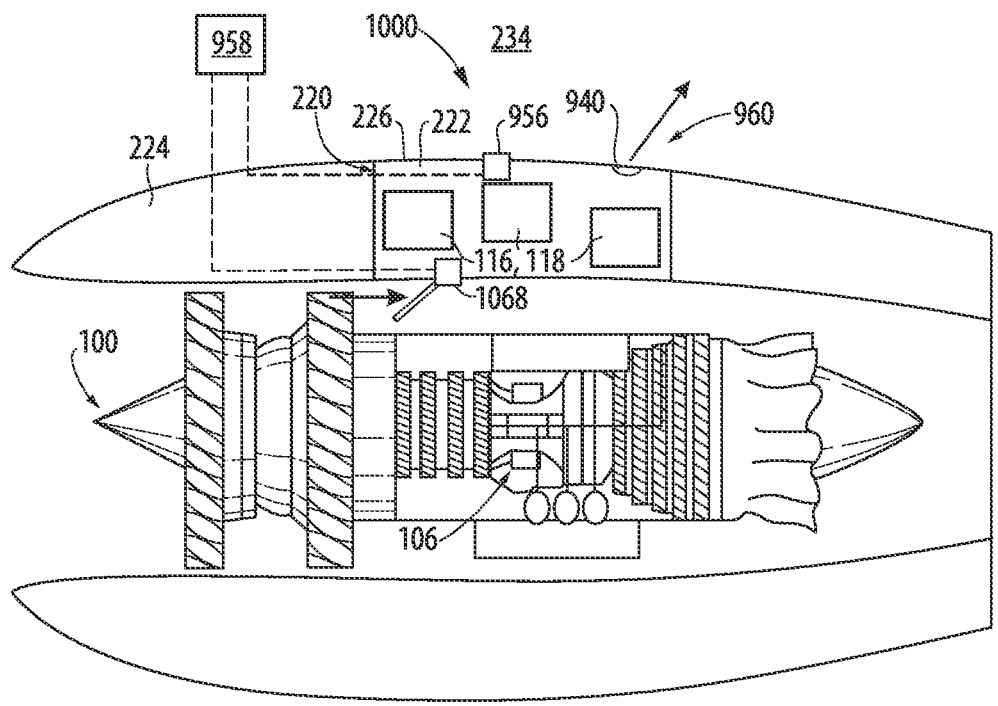
FIG. 10 is a schematic side elevation view of another embodiment of the ventilation system of FIG. 2.
Figure 11:
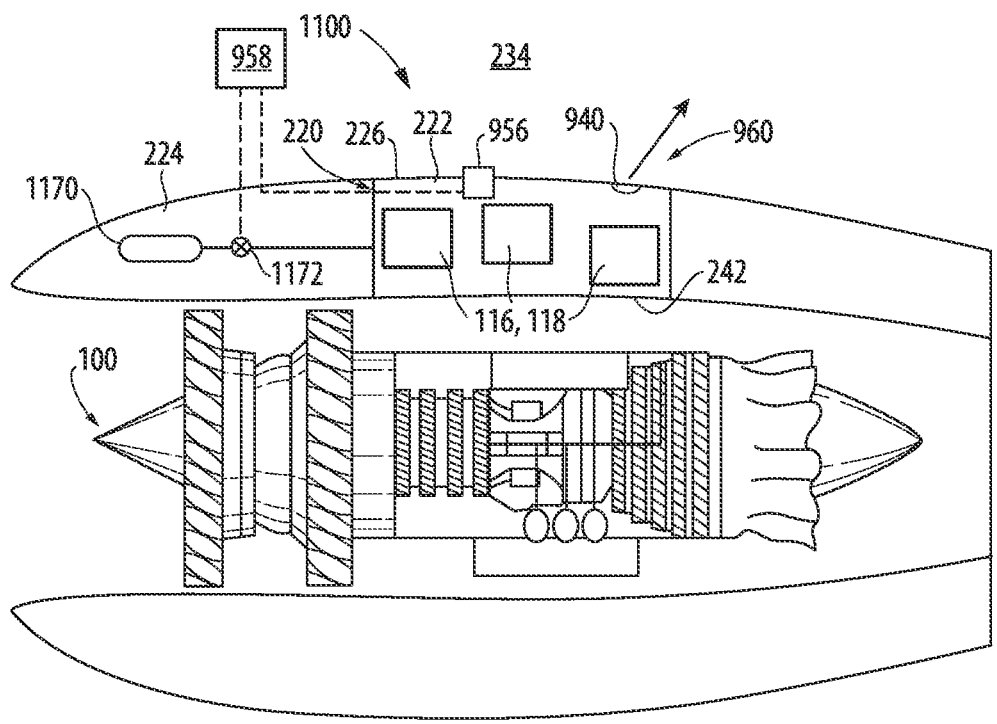
FIG. 11 is a schematic side elevation view of another embodiment of the ventilation system of FIG. 2.

In accordance with yet another aspect of this disclosure, such as shown in FIGS. 9-11, there is provided a system 900, 1000, 1100 for handling fugitive gaseous fuel in the aircraft engine 100 (e.g. gaseous fuel escaped from fuel accessories 116), similar to that of FIGS. 4-7. For brevity, the description of common elements that have been described above are not repeated. In the embodiments of FIGS. 9-11, the vent 230, 330, 430, 530, 630 can be configured for selective active ventilation of the interior space 222 in addition to or in lieu of a passive ventilation configuration as those described above.

With continued reference to FIG. 9, the accessory box 220 includes a sensor 956 operatively connected to detect fuel gas within the interior space 222 and a ventilation system 900 in fluid communication with the interior space 222. In embodiments, the sensor 956 includes at least one of a temperature sensor, a flame sensor, and/or a gas species sensor. The sensor 956 can be located above the engine 100 and on a top of the accessory box 220 relative to the direction of gravity G so that sensors 956 will detect the presence of fuel gas as it rises, e.g. before a buoyant fuel gas fills the entire interior space 222.

A controller 958 is operatively connected to the sensor 956 and to the ventilation system 930 where the controller 958 includes machine readable instructions configured to cause the controller 958 to command the ventilation system 900 to actively purge the interior space 222 of fuel gas upon receipt of an input signal from the sensor 956 indicative of presence of the fuel gas within the interior space 222. In certain embodiments, the controller 958 can be an aircraft full authority digital engine (or electronics) control (FADEC) or any other suitable controller.

In embodiments, still with reference to FIGS. 9-11, the ventilation system 900 includes a selective vent 930 defined through a wall of the accessory box (e.g. any of outer wall 226 or inner wall 242). The vent 930 has a venting configuration selectively moveable between an open position and a closed position. In the open position, when the sensor 956 has detected a presence of fuel gas, the vent 930 allows for the escape of gaseous fuel in the interior space 222 of the accessory box 220 to the external space. In the closed position, when no fuel gas is detected in the interior space 222 (e.g. normal operation), the accessory box 220 can be tightly sealed to prevent entry or exit of fluid into or out of the accessory box 220.

For example, the vent includes exhaust port door 940 defined through a wall of the accessory box for fluid communication between the interior space 222 and an ambient space 234 or environment external 234 to the accessory box. The exhaust port door 940 can be selectively moveable (e.g. via controller 958) between the open and closed position. It is contemplated that the exhaust port 940 door can be in an aft portion or a downstream portion of the accessory box relative to purge flow, depending on the particular application, engine type, or internal architecture for example. It is contemplated that the vent 930 can alternatively be a passive or permanent port, hole, or slot through the wall of the accessory box (e.g. as in FIG. 1), or any other suitable vent structure.

In some embodiments, such as in FIG. 9, the ventilation system 900 includes compressor bleed conduit 954 in selective fluid communication between the compressor 106 and the interior space 222 through a valve 964. The valve 964 is operatively connected to and controlled by the controller 958 to place compressor bleed air in fluid communication with the interior 222 space upon detection of fuel gas in the interior space 222, as indicated in FIG. 9 by the broken lines. Opening the valve 964 and forcing compressed air into the accessory box 220 will purge fuel gas out of the accessory box 220, through the exhaust port door 940, and into the ambient space 234.

In some embodiments, such as shown in FIG. 10, the ventilation system 1000 can be similar to that of FIG. 9. In ventilation system 1000 an air scoop door 1066 is defined in a wall of the accessory box (e.g. inner wall 242) upstream of the exhaust port 940 relative to purge flow out of the exhaust port 940. The air scoop door 1066 includes an actuator 1068 configured to selectively move the air scoop door 1066 between an open position and a closed position, the open position allowing flow from the interior space to the ambient environment 234 and the closed position blocking said flow. In the open position, purge air can flow through the air scoop 1066 and out of the accessory box 220 through the exhaust port door 940 and into the ambient space 234. The actuator 1068 is also operatively connected to and controlled by the controller 958 to open the air scoop door 1066 upon detection of fuel gas in the interior space 222 and to close the air scoop door 1066 when fuel gas is no longer detected in the interior space 222.

In some embodiments, such as shown in FIG. 11, a source of compressed inert gas 1170 (e.g. Halon, Nitrogen, or the like) is in selective fluid communication with the interior space 222 through a valve 1172. The valve 1172 is operatively connected to and controlled by the controller 958 to place the source of compressed inert gas 1170 in fluid communication with the interior space 222 upon detection of fuel gas in the interior space 222. Upon detection of fuel gas in the interior space 222, the valve 1172 will open and purge the accessory box 220, forcing any fuel gas out of the interior space 222, through the exhaust port door 940, and into the ambient space 234. As shown, the compressed inert gas source 1170 can be located in the nacelle 224 with the accessory box 220, but external to the accessory box 220, however it is contemplated that the compressed inert gas source 1170 may be external to the engine 100 entirely, or may come from another inert gas system located onboard the aircraft 1. For example, the source of compressed inert gas can be the same source of compressed inert gas in a sweep structure, such as that described in U.S. patent application Ser. No. 17/246,382 filed Apr. 30, 2021, the entire content of which is incorporated herein by reference.

In accordance with yet another aspect of the present disclosure, a method for handling fugitive fuel gas in an aircraft engine 100 includes detecting a presence of fuel gas in an accessory box 220. The method includes actively ventilating fuel gas out from an interior space 222 of an accessory box 220 through at least one opening defined through a wall of the accessory box 220, where ventilation is performed using any of the active ventilation systems 900, 1000, 1100 as described above or contemplated herein.

Figure 12:
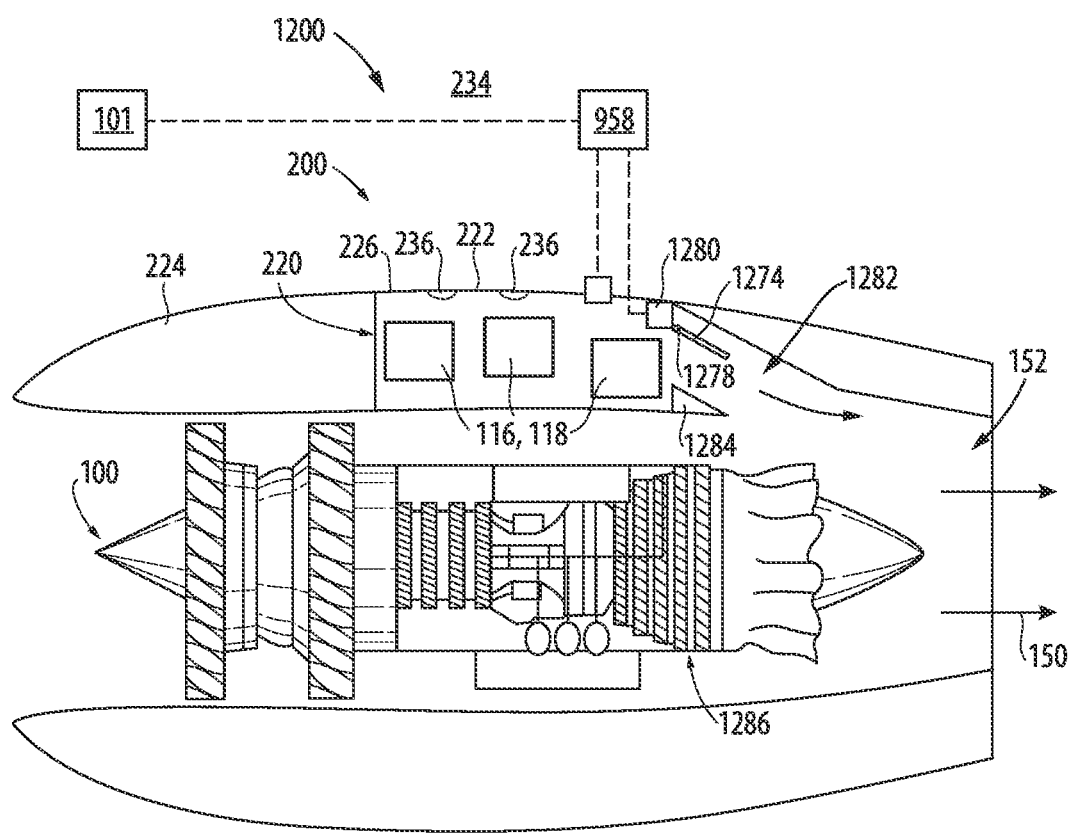
FIG. 12 is a schematic side elevation view of another embodiment of the ventilation system of FIG. 2.
Figure 13:
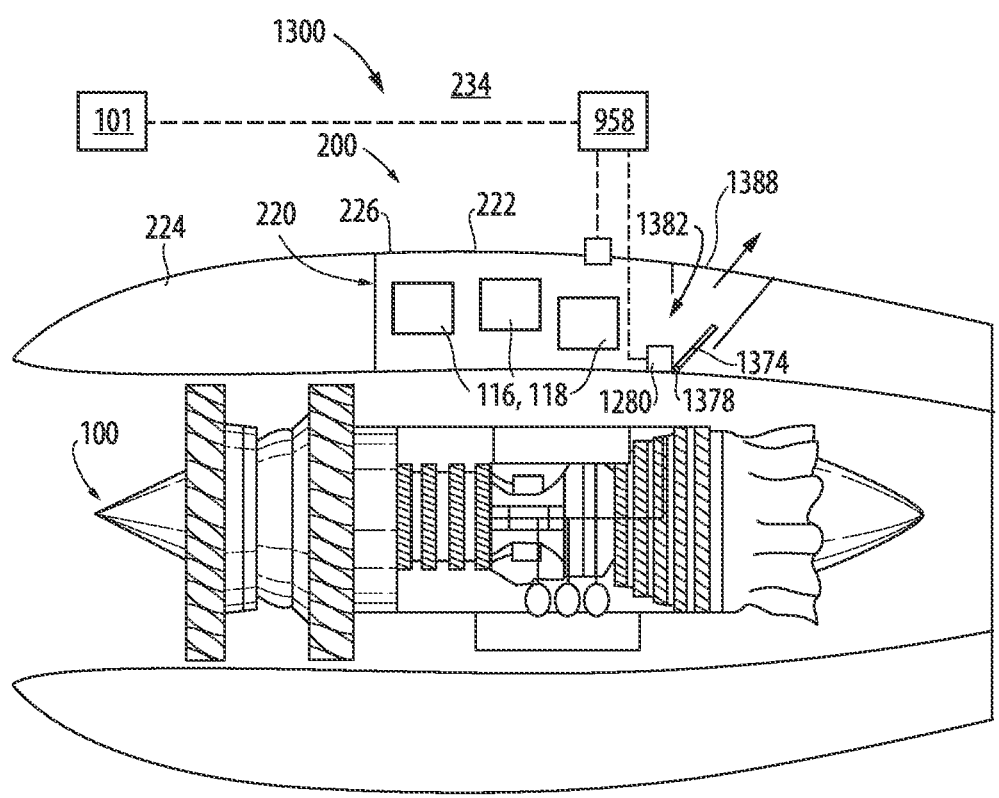
FIG. 13 is a schematic side elevation view of another embodiment of the ventilation system of FIG. 2.

In accordance with yet another aspect of the present disclosure, as shown in FIGS. 12-13, there is provided a system 1200 for managing detonation in a fuel system 102 of an aircraft engine 100. The system 1200 can be similar to that of systems 900, 1000, 1100 described above having similar vents and ventilation systems for active and/or passive purging of fuel gas. For brevity, the description of common elements that have been described above are not repeated. The system 1200 comprises a blast door 1274 engaged with the accessory box 220.

The blast door 1274 can be any suitable structure providing a large volume pressure release valve function. The blast door 1274 is engaged to the accessory box 220 covering an opening 1276 in a wall of the accessory box 220. The blast door 1274 is moveable between a first position and a second position. In certain embodiments, in the first position, the blast door 1274 covers the opening 1276 to seal the opening 1276, making the accessory box 220 airtight. In certain embodiments, in the first position, the blast door covers the opening 1276 to seal the opening 1276, however the accessory box 220 is not airtight. In this case, the accessory box 220 may contain a passive ventilation system, such as those similar to that shown in FIGS. 4-8, where an inlet port and an outlet port (e.g. ports 236) may be included for evacuation of gas from the interior space 222 while the blast door 1274 remains in the first position.

In the second position the blast door 1274 is open to a space external to the accessory box 220 to open a flow path from the interior space 222 to the space external 234 from the accessory box 220 for relief of pressure in the interior space 222 in the event of a detonation in the interior space 222. This detonation flow is indicated by the arrows in FIGS. 12-13. In embodiments, the walls of the accessory box include a carbon fiber and/or Kevlar material to protect the nacelle 224 and surrounding engine components and aircraft if detonation occurs.

The blast door 1274 is engaged to the accessory box 220 with a frangible connection so that in the event of detonation, the blast door 1274 will be released from its engagement to the accessory box 220 to open the flow path. The frangible connection should be such that the blast door 1274 remains in the first position even if fugitive gas has leaked into the accessory box 220 or if flight becomes particularly turbulent. The blast door 1274 is hingedly engaged to the accessory box with a biased hinge 1278 where the biased hinge 1278 biases the blast door 1274 to the first position and the biasing force is configured to be overcome by detonation within the interior space 222.

In embodiments, the blast door 1274 is passive, configured to open from the closed position under forces of a detonation within the interior space. No operative control places the blast door 1274 into the first position from the second position, for example a sensor 1280 can be operatively connected to the blast door 1274 to detect opening of the blast door 1274 and produce an output signal indicative of the blast door 1274 opening, for example to alert a pilot 101 that a detonation has occurred or the blast door 1274 has been released in some other manner, so that the pilot 101 can take corrective action as needed.

In some embodiments, such as shown in FIG. 12, the hinge 1278 is positioned on an upper portion of the accessory box 220. The blast door 1274 is configured to swing open on the hinge 1278 from the first position to the second position to deflect detonation gas downward in the event of a detonation in the interior space 222. In this embodiments, the nacelle 224 includes a detonation duct 1282 connecting from the accessory box 220 to the exhaust duct 152 of the engine nacelle 224 for evacuation of detonation gas from the interior space 222 in a direction that extends radially inward and aft from the accessory box 220 to the exhaust duct 152 for expulsion with engine exhaust 150. A deflector 1284 can be mounted in the nacelle 224 between the blast door 1274 and a portion of an engine core 1286 radially inward from the accessory box 220 to deflect detonation gas away from the portion of the engine core 1286.

In some embodiments, such as shown in FIG. 13, the hinge 1378 is positioned on a lower portion of the accessory box 220. The blast door 1374 is configured to swing open on the hinge 1378 from the first position to the second position to deflect detonation gas upward in the event of a detonation in the interior space 222. In this embodiment, the detonation duct 1382 connects from the accessory box 220 to an outward vent 1388 of the engine nacelle to evacuate detonation gas from the interior space 222 in a direction that extends radially outward and aft from the accessory box 220, through the vent 1388, and out of the nacelle 224 to the external space 234.

In accordance with yet another aspect of this disclosure, there is provided a method for handling gaseous fuel in an aircraft engine 100. In embodiments, the method includes opening a passive blast door 1274, 1374 of an accessory box 220 under detonation of fuel gas within an interior space 222 of the accessory box 220. In certain embodiments, the method includes channeling detonation gas from the interior space to an exhaust duct 150 of the aircraft engine 100 using any suitable method described herein and sending a signal to a pilot 101 indicative of the blast door 1274, 1374 being open.

The methods and systems of the present disclosure, as described above and shown in the drawings, provide for management of fugitive fuel gas in an aircraft engine by preventing the spread of the fugitive fuel gas to the larger surrounding nacelle, thereby limiting the amount of energy provided by the fuel gas. The methods and systems provided herein also act to separate any gaseous leak from most potential ignition sources (such as electrical accessories or hot engine surfaces). Moreover, if a detonation were to occur, the methods and systems provide for exhausting the detonated gas while protecting the surrounding aircraft.

While the apparatus and methods of the subject disclosure have been shown and described, those skilled in the art will readily appreciate that changes and/or modifications may be made thereto without departing from the scope of the subject disclosure. For example, the following particular embodiments of the present technology are likewise contemplated, as described herein next by clauses.

Clause 1. A system for an aircraft engine (100), comprising:
an accessory box (220);
a fuel accessory (116) located in an interior space (222) within the accessory box (220), wherein a vent (230) is defined through a wall (226, 242) of the accessory box.

Clause 2. The system as recited in clause 1, wherein the vent includes a plurality of holes or slots (236) in an outer wall (226) of the accessory box for passage of gaseous fuel from the interior space.

Clause 3. The system as recited in clause 2, wherein the aircraft engine is a gas turbine engine, wherein the outer wall of the accessory box forms a portion of an outer nacelle wall (226) of the engine, and wherein the outer wall is on an upward facing portion (228) of the outer nacelle wall relative to the direction of gravity (G).

Clause 4. The system as recited in clause 2, wherein the vent includes a forward facing air scoop (338) with an air passage communicating through the outer wall and an exhaust port (340) through a wall of the accessory box downstream of the air scoop relative to flow into the air scoop.

Clause 5. The system as recited in clause 4, wherein the exhaust port is defined through the outer wall of the accessory box downstream of the air scoop relative to flow into the air scoop.

Clause 6. The system as recited in clause 1, wherein an inner wall (242) of the accessory box forms a portion of an inner bypass duct wall.

Clause 7. The system as recited in clause 6, wherein the vent includes a forward facing air scoop (338) with an air passage communicating through the inner wall and an exhaust port (340) through a wall of the accessory box downstream of the forward facing air scoop relative to flow into the air scoop.

Clause 8. The system as recited in clause 7, wherein the exhaust port is defined through an outer wall (226) of the accessory box downstream of the air scoop relative to flow into the air scoop.

Clause 9. The system as recited in clause 1, wherein the vent includes an inlet (544) defined in a wall of the accessory box, and an exhaust opening (546) toward an exhaust jet pipe (548) in an exhaust duct (152) for entraining flow from the inlet through the accessory box, and out the exhaust opening and jet pipe.

Clause 10. The system as recited in clause 1, wherein the vent includes a compressor bleed conduit (654) connecting between a compressor (106) and the interior space of the accessory box, and an exhaust port (340) downstream in a wall (226) of the accessory box downstream of the compressor bleed conduit relative to flow from the compressor.

Clause 11. The system as recited in clause 1, wherein the vent is configured for passive ventilation of the interior space.

Clause 12. The system as recited in clause 1, wherein the fuel accessory includes a plurality of fuel accessories (116), each fuel accessory having an interface (118) connected between another of the plurality of fuel accessories, wherein at least each interface is included within the accessory box, wherein the plurality of fuel accessories include at least one of a valve, a metering unit, a tube, a tube fitting, a pump, and/or an evaporator.

Clause 13. The system as recited in clause 12, wherein at least some fuel accessories convey liquid therein and wherein at least some fuel accessories convey gas therein, wherein the gas is evaporated from the liquid.

Clause 14. The system as recited in clause 1, further comprising:
an aircraft engine (100); and
a fuel system (102) configured to combust gaseous fuel, the fuel system in fluid communication with a fuel source (114) through the at least one fuel accessory, wherein the accessory box is above the engine relative to the direction of gravity.

Clause 15. A method for handling gaseous fuel in an aircraft engine (100) comprising:
passively ventilating fuel gas out from an interior space (222) of an accessory box (220) through an opening (236) defined through a wall (226, 242) of the accessory box.

Clause 16. The method as recited in clause 15, wherein the opening is defined in an upper wall (226) of the accessory box, relative to the direction of gravity (G), wherein passively ventilating fuel gas includes allowing buoyancy forces (B) to drive fuel gas upward out of the interior space through the opening.

Clause 17. The method as recited in clause 15, wherein passively ventilating fuel gas includes purging the interior space with air from outside an engine nacelle (224), and exhausting the interior space with an exhaust flow (150) directed outward from the engine nacelle.

Clause 18. The method as recited in clause 15, wherein passively ventilating fuel gas includes purging the interior space with air from inside an engine nacelle (224), and exhausting the interior space with an exhaust flow (150) directed outward from the engine nacelle.

Clause 19. The method as recited in clause 15, wherein passively ventilating fuel gas includes purging the interior space with air drawn through the interior space by a downstream jet pipe (548) in an exhaust outlet (152) of an engine nacelle.

Clause 20. The method as recited in clause 15, wherein passively ventilating fuel gas includes purging the interior space with compressor bleed air from an engine compressor.

Clause 21. A system for an aircraft engine (100) comprising:
an accessory box (220);
a fuel accessory (116) located in an interior space (222) within the accessory box;
a sensor (956) operatively connected to detect fuel gas within the interior space;
a ventilation system (900, 1000, 1100) in fluid communication with the interior space; and
a controller (958) operatively connected to the sensor and to the ventilation system, wherein the controller includes machine readable instructions configured to cause the controller to:
command the ventilation system to actively purge the interior space of fuel gas upon receipt of an input signal from the sensor indicative of presence of the fuel gas within the interior space.

Clause 22. The system as recited in clause 21, wherein the ventilation system includes a selective vent (930) defined through a wall (226, 242) of the accessory box with a venting configuration and a closed position.

Clause 23. The system as recited in clause 22, wherein the vent includes an exhaust port door (940) defined through a wall (226) of the accessory box for fluid communication between the interior space and an ambient environment (234) external to the accessory box, wherein an open position allows flow out from the interior space to the ambient environment and wherein a closed position blocks said flow.

Clause 24. The system as recited in clause 22, wherein the vent includes an exhaust port door (940) defined through a wall (226) of the accessory box for fluid communication between the interior space and an ambient environment (234) external to the accessory box, and wherein the ventilation system includes a compressor bleed conduit (954) in selective fluid communication with the interior space through a valve (964), wherein the valve is operatively connected to the controller to place compressor bleed air in fluid communication with the interior space upon detection of fuel gas in the interior space.

Clause 25. The system as recite in clause 22, wherein the ventilation system includes:
an exhaust port door (940) defined through a wall (226) of the accessory box for fluid communication between the interior space and an ambient environment (234) external to the accessory box; and
an air scoop door (1066) in a wall (226, 242) of the accessory box upstream of the exhaust port relative to purge flow out of the exhaust port, wherein the air scoop door includes an actuator (1068) configured to selectively move the air scoop door between an open position and a closed position, wherein the open position allows flow from the interior space to the ambient environment and wherein the closed position blocks said flow.

Clause 26. The system as recited in clause 25, wherein the exhaust port door is positioned on a radially outer wall (226) of the accessory box, and wherein the air scoop door is positioned on a radially inner wall (242) of the accessory box.

Clause 27. The system as recited in clause 22, wherein the ventilation system includes:
an exhaust port door (940) defined through a wall (226) of the accessory box for fluid communication between the interior space and an ambient environment (234) external to the accessory box; and
a source of compressed inert gas (1170) in selective fluid communication with the interior space through a valve (1172), wherein the valve is operatively connected to the controller to place the source of compressed inert gas in fluid communication with the interior space upon detection of fuel gas in the interior space.

Clause 28. The system as recited in clause 21, wherein the sensor includes at least one of a temperature sensor, a flame sensor, and/or a gas species sensor.

Clause 29. The system as recited in clause 21, wherein the accessory box is located in a nacelle (224).

Clause 30. The system as recited in clause 29, wherein an outer wall (226) of the accessory box forms a portion of an outer nacelle wall of the nacelle, and wherein the outer wall is on an upward facing portion (228) of the outer nacelle wall relative to the direction of gravity (G).

Clause 31. The system as recited in clause 21, wherein the fuel accessory includes a plurality of fuel accessories (116), each fuel accessory having an interface (118) connected between another of the plurality of fuel accessories, wherein at least each interface is included within the accessory box.

Clause 32. The system as recited in clause 21, wherein the at least one fuel accessory includes at least one of a valve, a metering unit, a tube, and/or a tube fitting, a pump, and/or an evaporator.

Clause 33. The system as recited in clause 32, wherein at least some fuel accessories convey liquid therein and wherein at least some fuel accessories convey gas therein, wherein the gas is evaporated from the liquid.

Clause 34. The system as recited in clause 21, further comprising:
an aircraft engine (100); and
a fuel system (102) configured to combust gaseous fuel, the fuel system in fluid communication with a fuel source (114) through the at least one fuel accessory, wherein the accessory box is above the engine relative to the direction of gravity (G).

Clause 35. A method for handling fuel gas in an aircraft engine (100) comprising:
detecting a presence of fuel gas in an accessory box (220); and
actively ventilating fuel gas out from an interior space (222) of the accessory box through an opening (236) defined through a wall of the accessory box.

Clause 36. The method as recited in clause 35, wherein the opening is defined in an upper wall (226) of the accessory box, relative to the direction of gravity, wherein actively ventilating fuel gas includes drawing compressor bleed air from a compressor bleed conduit (954) in communication with a compressor (106) to drive fuel gas upward out of the interior space through the at least one opening (236) upon detection of fuel gas in the interior space.

Clause 37. The method as recited in clause 36, wherein drawing compressor bleed air from the compressor bleed conduit further includes opening a valve (964) in the compressor bleed conduit upon detection of fuel gas in the interior space.

Clause 38. The method as recited in clause 35, wherein actively ventilating fuel gas includes actuating an air scoop door (1066) to an open position upon detection of fuel gas in the interior space; purging the interior space with air from inside an engine nacelle (224) through the air scoop; and exhausting the interior space with an exhaust flow (150) directed outward from the engine nacelle.

Clause 39. The method as recited in clause 35, wherein actively ventilating fuel gas includes purging the interior space with a compressed inert gas source (1107) through the interior space, wherein the compressed inert gas source in fluid communication with the interior space.

Clause 40. A system for an aircraft engine (100) comprising:

an accessory box (220);

a fuel accessory (116) located in an interior space (222) within the accessory box; and a blast door (1274) engaged to the accessory box covering an opening (1276) in a wall of the accessory box, the blast door moveable between a first position covering the opening and a second position open to a space external from the accessory box to open a flow path from the interior space to the space external from the accessory box for relief of pressure in the interior space in event of a detonation in the interior space.

Clause 41. The system as recited in clause 40, wherein the blast door is engaged to the accessory box with a frangible connection configured to release the blast door from the accessory box to open the flow path in event of a detonation in the interior space.

Clause 42. The system as recited in clause 40, wherein the blast door is hingedly engaged to the accessory box with a biased hinge (1278), wherein the biased hinge biases the blast door to the first position with a biasing force configured to be overcome by a detonation within the interior space.

Clause 43. The system as recited in clause 42, wherein the hinge is positioned on an upper portion of the accessory box, wherein the blast door is configured to swing open on the hinge from the first position to the second position to deflect detonation gas downward in event of a detonation in the interior space.

Clause 44. The system as recite in clause 43, further comprising an engine nacelle (224), wherein the accessory box is located inside the engine nacelle, and wherein the nacelle includes a detonation duct (1282) connecting from the accessory box to an exhaust duct (152) of the engine nacelle.

Clause 45. The system as recited in clause 44, further comprising a deflector (1284) mounted in the nacelle between the blast door and a portion of an engine core (1286) radially inward from the accessory box.

Clause 46. The system as recited in clause 42, wherein the hinge is positioned on a lower portion of the accessory box, wherein the blast door is configured to swing open on the hinge from the first position to the second position to deflect detonation gas upward in event of a detonation in the interior space.

Clause 47. The system as recite in clause 46, further comprising an engine nacelle (224), wherein the accessory box is located inside the engine nacelle, and wherein the nacelle includes a detonation duct (1282) connecting from the accessory box to an outward vent of the engine nacelle.

Clause 48. The system as recited in clause 40, wherein the blast door is passive, configured to open from the first position under forces of a detonation within the interior space.

Clause 49. The system as recited in clause 48, further comprising a sensor (1280) operatively connected to the blast door to detect opening of the blast door and produce an output signal indicative of the blast door opening.

Clause 50. The system as recite in clause 40, wherein the wall of the accessory box includes a carbon fiber and/or Kevlar material.

Clause 51. The system as recited in clause 40, wherein when the blast door in the first position, the accessory box is airtight.

Clause 52. The system as recited in clause 40, wherein when the blast door is in the first position the blast door is not airtight, and further comprising an inlet port and an outlet port (236) for evacuation of gas from the interior space.

Clause 53. The system as recited in clause 40, wherein the fuel accessory includes at least one of a valve, a metering unit, a tube, and/or a tube fitting, a pump, and/or an evaporator.

Clause 54. The system as recited in clause 40, wherein at least some fuel accessories convey liquid therein and wherein at least some fuel accessories convey gas therein, wherein the gas is evaporated from the liquid.

Clause 55. The system as recited in clause 40, further comprising:

an aircraft engine (100); and a fuel system (102) configured to combust gaseous fuel, the fuel system in fluid communication with a fuel source (114) through the at least one fuel accessory, wherein the accessory box is above the engine relative to the direction of gravity (G).

Clause 56. A method for handling gaseous fuel in an aircraft engine (100) comprising:

opening a passive blast door (1274, 1374) of an accessory box (220) under detonation of fuel gas within an interior space of the accessory box.

Clause 57. The method as recited in clause 56, further comprising channeling detonation gas from the interior space to an exhaust duct (152) of the aircraft engine.

Clause 58. The method as recited in clause 56, further comprising channeling detonation gas from the interior space outward from a radially outward surface (228) of an engine nacelle (224).

Clause 59. The method as recited in clause 56, further comprising detecting opening of the blast door and sending a signal indicative of detonation in the accessory box.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit,"

"module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A method for handling gaseous fuel in an aircraft engine comprising:
    opening a passive blast door of an accessory box under detonation of fuel gas within an interior space of the accessory box, the accessory box positioned in a nacelle and radially outward, relative to a center axis of the aircraft engine, from an exhaust duct of the aircraft engine; and
    discharging detonation gas, generated by the detonation of the fuel gas within the accessory box, from the accessory box into the exhaust duct of the aircraft engine, including channeling the detonation gas from the interior space, via the passive blast door, into a detonation duct interconnecting the accessory box with the exhaust duct.

2. The method as recited in claim 1, further comprising detecting opening of the blast door and sending a signal indicative of detonation in the accessory box.

* * * * *